United States Patent
Karl

[11] Patent Number: 5,868,171
[45] Date of Patent: Feb. 9, 1999

[54] COMPOSITE CONDUIT FOR CARRYING FUEL OIL

[75] Inventor: Lou Karl, Mineola, N.Y.

[73] Assignee: LDC Enviro Corp., Mineola, N.Y.

[21] Appl. No.: 897,877

[22] Filed: Jul. 21, 1997

Related U.S. Application Data

[63] Continuation of Ser. No. 304,870, Sep. 13, 1994, abandoned.

[51] Int. Cl.$^6$ ..................................................... F16L 11/14
[52] U.S. Cl. .................... 139/139; 138/143; 138/DIG. 1; 138/DIG. 6; 138/DIG. 7; 427/160; 264/209.4
[58] Field of Search .................................... 138/137, 139, 138/140, 141, 143, 177, DIG. 1, DIG. 6, DIG. 7; 427/160, 435, 434.2; 264/209.4

[56] References Cited

U.S. PATENT DOCUMENTS

| | | | |
|---|---|---|---|
| 751,985 | 2/1904 | Humiston | 138/DIG. 6 |
| 2,039,781 | 5/1936 | Debenedetti | 138/70 |
| 2,581,920 | 1/1952 | Kuhn | 138/DIG. 1 |
| 2,810,424 | 10/1957 | Swartswelter et al. | 138/DIG. 7 |
| 3,007,809 | 11/1961 | Chadwick | 427/434.2 |
| 3,015,133 | 1/1962 | Nichols | 138/139 |
| 3,101,744 | 8/1963 | Warnaka | 138/139 |
| 3,311,133 | 3/1967 | Kinander | 138/139 |
| 3,420,277 | 1/1969 | Ceintrey | 138/143 |
| 3,470,046 | 9/1969 | Verdin | 156/86 |
| 3,479,621 | 11/1969 | Martin | 333/95 |
| 3,570,545 | 3/1971 | Benteler | 138/143 |
| 4,071,048 | 1/1978 | Watase | 138/139 |
| 4,213,486 | 7/1980 | Samour et al. | 138/143 |
| 4,216,802 | 8/1980 | Bonnes et al. | 138/143 |
| 4,307,756 | 12/1981 | Voigt et al. | 138/149 |
| 4,395,159 | 7/1983 | Kanuks et al. | 138/DIG. 6 |
| 4,448,798 | 5/1984 | Kageyama et al. | 427/435 |
| 4,577,664 | 3/1986 | Takahashi et al. | 138/143 |
| 4,743,329 | 5/1988 | Hata | 156/287 |
| 4,865,880 | 9/1989 | Silbermann et al. | 427/434.2 |
| 5,007,462 | 4/1991 | Kano | 138/105 |

*Primary Examiner*—Denise L. Ferensic
*Assistant Examiner*—James F. Hook
*Attorney, Agent, or Firm*—Robert D. Katz; Robert T. Maldonado

[57] ABSTRACT

An elongate deformable conduit and method of fabrication thereof adapted for the subterranean conveying of petroleum products and petrochemicals has an inner copper tube to which is bonded an outer layer of flexible polyvinyl chloride up to about one-third inch in radial wall thickness. In a preferred embodiment the polyvinyl chloride contains an ultraviolet stabilizer and is extruded in a wall thickness up to about one-tenth inch about the copper tube, and the copper tube has an outside diameter ranging up to about two inches and is sized to convey heating oil substantially below ground.

18 Claims, 3 Drawing Sheets

5,868,171

COMPOSITE CONDUIT FOR CARRYING FUEL OIL

This is a continuation of application Ser. No. 08/304,870, filed Sep. 13, 1994 now abandoned.

FIELD OF THE INVENTION

The present invention relates to a process and apparatus for conveying petroleum products, petrochemicals or organic solvents below ground level, and more particularly to composite deformable tubing having bonded thereto a protective layer resistive to attack by acidic or basic conditions prevalent in soil.

BACKGROUND OF THE INVENTION

Metal pipe has been used buried below ground to carry oil, gasoline, petroleum products or harmful solvents. Steel or iron pipe has been used, but generally requires the use of several layers of resin coatings outside or polymeric tape wrapping materials to provide protection from the environment. Examples of patents relating to the application of two or more polymer coatings are U.S. Pat. Nos. 4,213,486 to Samour et al. and 3,420,277 to Ceintrey. However, steel pipe cannot be coiled nor easily bent for purposes of installation.

Copper pipe has been used for carrying these fluids below ground and also embedded in concrete walls and floors. Copper is more easily deformed than steel or iron pipe, and is desirably less subject to corrosion when buried because it tends to form a protective film with mixtures of oxide, basic carbonate and basic sulfate. Conventionally, bare copper piping used to supply fuel oil to oil burners has at least a ⅜ inch O.D. (outside diameter) and a 0.035 inch nominal and 0.032 inch minimum wall thickness.

Copper tubes, however, have disadvantages because they are subject to corrosive attack by acidic or basic conditions in the soil, which may exist naturally or be influenced by vegetation or fertilizers, or alkaline attack in the concrete. After time, leaks may form in a copper pipe permitting the fluid being carried therein to leach into the surrounding soil or structure. If the fluid is fuel oil or gasoline, nearby water and soil may be adversely affected. Further, local or national regulations of governmental agencies may require site clean-up if a fuel oil leak occurs, a potentially costly affair. Such a financial burden weighs particularly heavy on homeowners experiencing a leaky fuel oil conduit.

Several solutions have been attempted. Polymeric tape wrapped around bare copper pipe prior to installation can provide some protection. Bare pipe has also been encased in polypropylene sleeves prior to installation. These methods involve extensive labor to install, and pose the risk of incomplete barrier protection.

Plastic pipes of polyethylene or polyvinyl chloride have also been used. However, while offering resistance to chemical attack, plastic pipes have several shortcomings. They are, for example, generally slightly permeable to water and gas. Flexible plastic tubes have relatively low mechanical strength, making them less able to withstand mechanical stress and pressure in the system, which may make them collapse or burst. Rigid plastic pipes, such as rigid polyvinyl chloride (which may consist of the homopolymer, copolymer, or polymer blends), are insufficiently deformable to provide convenient installation.

U.S. Pat. No. 3,570,545 (Benteler) proposes a steel tube having a copper inner liner and plastic outer jacket, and U.S. Pat. No. 2,039,781 (Debenedetti) uses two concentric copper tubes with an intermediate rubber liner in an attempt to provide an improved conduit.

U.S. Pat. No. 4,216,802 (Bonnes et al.) provides a composite conduit for carrying corrosive fluids formed of a commercially standard sized copper tube to which is bonded with a hot melt adhesive a polyvinyl chloride coating of a thickness that must be tightly controlled to be 50% or more of the total radial wall thickness. The composite tube is said to be a standard outer diameter that may be used with the same conventional fittings as used for unitary metal or plastic tubes without having to skive away the outer plastic in order to provide a fluid-tight seal.

It is, therefore, an object of the invention to provide a coated metal pipe structure that may be disposed below ground to safely convey petroleum products or harmful solvents that is simple to fabricate and install, uses a minimal number of different components, has low manufactured cost, and that can be shipped and stored as a rolled coil, and which will resist attack by the fluid being conveyed and by acidic or alkaline conditions in the adjacent soil or concrete in which it is disposed.

SUMMARY OF THE INVENTION

These and other objects of the invention are achieved, and the foregoing disadvantages of the prior art are overcome, by providing a composite conduit for the underground conveyance of fuel, gasoline or petrochemicals that comprises an inner metallic tube and an outer thermoplastic layer. The inner tube is substantially rigid yet deformable and consists essentially of copper or an alloy thereof. The outer thermoplastic layer consists essentially of flexible polyvinyl chloride having a thickness of up to about one-third inch which surrounds the circumference of the inner tube. Each of the inner and outer tubes have a substantially uniform radial wall thickness. The outer tube protects the inner tube from the corrosive effects of a subterranean environment.

DETAILED DESCRIPTION OF THE INVENTION

Figure 1:
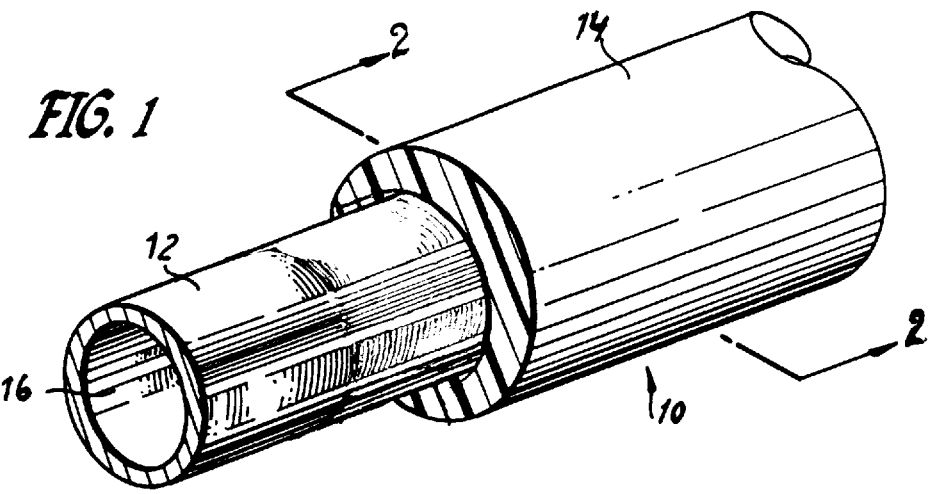
FIG. 1 is a perspective view of an embodiment of the invention partially cut-away.

Referring to the drawings, FIG. 1 depicts a composite conduit for carrying fuel oil, petroleum products, chemicals and solvents in accordance with the present invention generally designated with the reference numeral 10.

Figure 2:
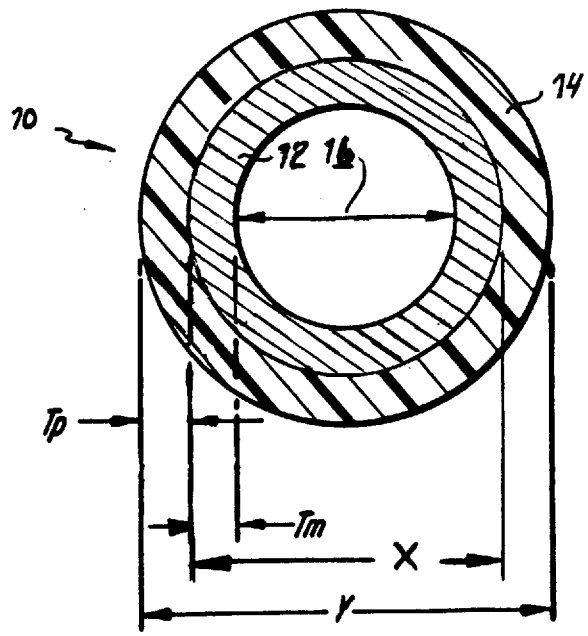
FIG. 2 is a cross-sectional view of the embodiment of FIG. 1, taken along line 2—2 on FIG. 1.

Referring to FIG. 1, the composite conduit 10 of the present invention is comprised of a metallic annular tube 12 about which is coextensively disposed an outer polymeric layer 14. Polymeric layer 14 is cut back in FIG. 1 to show more clearly the tube 12 surrounded by layer 14. As shown in FIGS. 1 and 2, the annular tube 12 has a substantially uniform wall thickness $T_m$ and a bore 16 therethrough. Polymeric layer 14 also has a substantially uniform wall thickness $T_p$. The resultant outside diameter "Y" of the composite conduit is the sum of the tube outside diameter "X" and twice the polymeric layer wall thickness $T_p$.

Tube 12 is preferably a seamless tube formed by any commonly known process such as extrusion, drawing, or welding and drawing, or the like. The tube wall should preferably be continuous or uninterrupted by a seam so as to be integrally sealed. The preferred embodiment has a substantially uniform radial wall thickness ($T_m$). Tube 12 should preferably be of copper or an alloy thereof. The tube is provided in any size convenient for the volume flow, fluid characteristics and safety parameters of the desired application, and the outside diameter "X" will typically lie in the range of 1/16 inch through about 4 inches. A typical copper tube size for use in residential oil heating system pipelines, a preferred use of the conduit 10, is 3/8 inch or 1/2 inch O.D. having a wall thickness of about 0.035 inch nominal (0.032 inch min.). The tube can advantageously be manufactured in accordance with accepted major international standards such as ASTM 8–200. Typical tube sizes for heavy equipment, or for carrying large volumes of oil or fuel, such as in an oilfield or refinery, can be in the range 1 inch to 2 inches or more O.D. The copper tube conforms to tubing outer diameters standardly established as whole fractional values increasing by equal increments of 1/16 inch up through 1 inch outside diameter and increasing by 1/8 inch increments in excess of 1 inch outside diameter, and including any present decimal or metric equivalents thereof. Copper tube 12 of the composite conduit of the present invention is compatible with standardly available fittings for jointing and coupling.

Polymeric layer 14 is formed from any suitable processable thermoplastic compound which provides the corrosion resistance to acidic or alkaline attack, weatherability and other characteristics desired. Commercially available jacketing compounds such as used for jacketing underground feeder (UF) electrical cable may suitably be used. Such jacketing material may advantageously be manufactured, for example, to meet the Underwriters' Laboratory UL-62 Standard for Flexible Cord and Fixture Wire. Such material is advantageously flame-retardant, moisture-, fungus-, and corrosion-resistant, and suitable for direct burial in the earth. Commercially available polyvinyl chloride compounds useful as jacketing include the resin Geon 8801 available from The Geon Company, P.O. Box 122, Moore & Walker Roads, Avon Lake, Ohio 44012 and the resin GA-7056-FR available from The Gitto/Global Corporation, 140 Leominster-Shirley Road, Glanna Park, P.O. Box 518, Lunenberg, Mass. 01462. It is presently preferred that outer layer 14 be extruded using the compound GA-7056-FR. However, it will be understood that the outer layer may be made from a number of thermoplastic materials which are available commercially, such as polyethylene. The GA-7056-FR compound is formulated from a relatively high molecular weight polyvinyl chloride resin whose relative viscosity lies in the range of between about 2 and 3, for example lying in the range of about 2.2 to 2.3. The GA-7056-FR is characterized by the properties described in Table 1.

It is preferred that layer 14 be extruded from a thermoplastically processable plasticized polyvinyl chloride compound containing an ultraviolet (UV) stabilizer. The UV stabilizer benzophenone can advantageously be used. It is presently understood that the addition of a UV stabilizer may enhance the durability of layer 14 for outdoor use. Furthermore, it may be desired to add a fungal inhibitor to provide enhanced fungal and microbial resistance to layer 14 in soil conditions where elevated temperature and humidity conditions might accelerate fungal or microbial attack. The fungal inhibitor bis, 2–3 oxy bis pharisne can advantageously be used. It is presently preferred that outer layer 14 be extruded from the compound GA-7056-FR blended with a UV inhibitor in the amount of about 0.444 wt. % of total formula weight, available from The Gitto/Global Corporation mentioned above. The properties of the GA-7056-FR are understood not to be disadvantageously affected by the addition of a stabilizer or inhibitor.

TABLE I

GA-7056-FR[1] resin physical properties.
Application:
Flexible 80 c UL-62 Class 12 Jacketing
75 c General Purpose Jacketing

| Property | Nominal Value | Units | ASTM Test Method |
|---|---|---|---|
| Specific Gravity | 1.38 | g/cm$^3$ | D-792 |
| Durometer Shore (A) | 85/80 | Inst./15 sec. | D-2240 |
| Tensile Strength | 2350 | psi | D-412 |
| Elongation | 340 | % | D-412 |
| Oxygen Index | 26 | % | D-2863 |
| Brittle Point | −31 | °C. (°F.-50) | D-746 |
| Oven Aged 10 Days @ 100° C. (.030" thick dumbbells) | | | |
| Retention of Elongation | 85 | % | UL-Standard |
| Retention of Tensile | 102.5 | % | UL-Standard |
| Oven Aged 7 Days @ 113° C. (.016" thick dumbbells) | | | |
| Retention of Elongation | 74.5 | % | UL-Standard |
| Retention of Tensile | 103 | % | UL-Standard |

Recommended Stock Temperature °F. 350–370
[1]Without added ultraviolet stabilizer or fungal inhibitor.

Polyvinyl chloride layer 14 may be applied over the outer surface of copper tube 12 by processes such as, for example, dipping, extrusion, spraying, powder fusion, sintering and the like. It is desirable that layer 14 not be adhesively bonded to tube 12, thus saving manufacturing costs and improving system reliability by constructing composite conduit 10 of as few parts as possible. It is preferred that layer 14 be extruded about the outer surface of copper tube 12 in such manner that layer 14 fits snugly about tube 12 with its inner surface directly in contact therewith. A thin substantially uniform polyvinyl chloride layer 14 can be tightly coated about a copper tube using an extrusion process of continuous length. Optionally, the polyvinyl chloride resin used to make the outer layer 14 may be cross-linked to improve certain properties during or subsequent to the process of applying it about tube 12. Such cross-linking may be accomplished by conventional chemical means such as heat curing of resins containing suitable amounts of a cross-linking agent. Where outer layer 14 is thermoplastically disposed about tube 12, the cross-linking is accomplished during such process.

The polyvinyl chloride layer ranges in radial wall thickness $T_p$ up to about one-third inch. The thickness $T_p$ does not depend in a fixed relationship upon the tube 12 wall thickness $T_m$, but fabrication and finished product handling considerations suggest the tendency of $T_p$ to become thicker with increasing tube outside diameter "X". However, a satisfactory polyvinyl chloride layer can be formed with a 0.032 inch wall thickness on a 3/8 inch O.D. copper tube and with a 0.048 inch wall thickness on a 1/2 inch O.D. copper tube. The composite conduit so formed is flexible and deformable without damage to the coating layer.

Copper tube 12 is sufficiently rigid to substantially retain the shape into which it is bent or formed. Tube 12 is preferably deformable in that the tube 12 can be bent by hand or with the aid of simple hand tools or hand- or power-operated tube bending machines with relative ease, as distinguished from rigid tubing or pipe that cannot be shaped with relative ease. The tube 12 generally is supplied in long rolls (not shown) which can be unwound to lay the tubing. An important feature of the composite conduit 10 is that it can be bent or unwound without collapse or rupture of the layer 14. In other words, the conduit 10 may be rolled into coils and unrolled without cracking or disturbing the polymer layer 14; the layer 14 is sufficiently thin to flex without cracking while the conduit 10 is being installed. Some drawn lengths of copper tubes or thick walled sections useful in some applications may be too rigid for convenient bending unless they are softened. If it is desirable to bend such a tube, the polyvinyl chloride layer 14 may be slit and peeled back or removed in that area so that the copper tube can be annealed before bending. After the copper tube has cooled, the softened portion can be bent in the usual way. After bending, the polyvinyl chloride layer 14 can be replaced and, if necessary, appropriate conventional insulating tape wrapped around the location where layer 14 had been cut. In most applications, the layer 14 should flex and the tube 12 can be bent without application of heat.

The composite conduit 10 structure can be provided in conventional 50' or 100' coils for ease of storage, transportation and installation. Hard temper drawn straight lengths in any conventional lengths, for example 10' or 20' lengths, may be produced when shorter lengths are desired. Straight sections are also suitable for larger pipe sections, such as tube diameters above 1¼ inches. Conventional methods of joining and coupling copper tubes 12 may be used with the composite conduit 10, such as soldering, brazing or compression fittings, depending on the application. To facilitate joining and installing, the outer layer 14 may be cut and peeled back a sufficient distance to permit coupling. After installation, the outer layer 14 may be folded back over the tube and appropriate insulation tape, such as a polymeric material tape, may be wrapped over the exposed joint area, or an insulation sleeve may be applied, taking care that the sleeve and outer layer should be trimmed so that they butt each other to form an even and continuous insulation.

Figure 3:
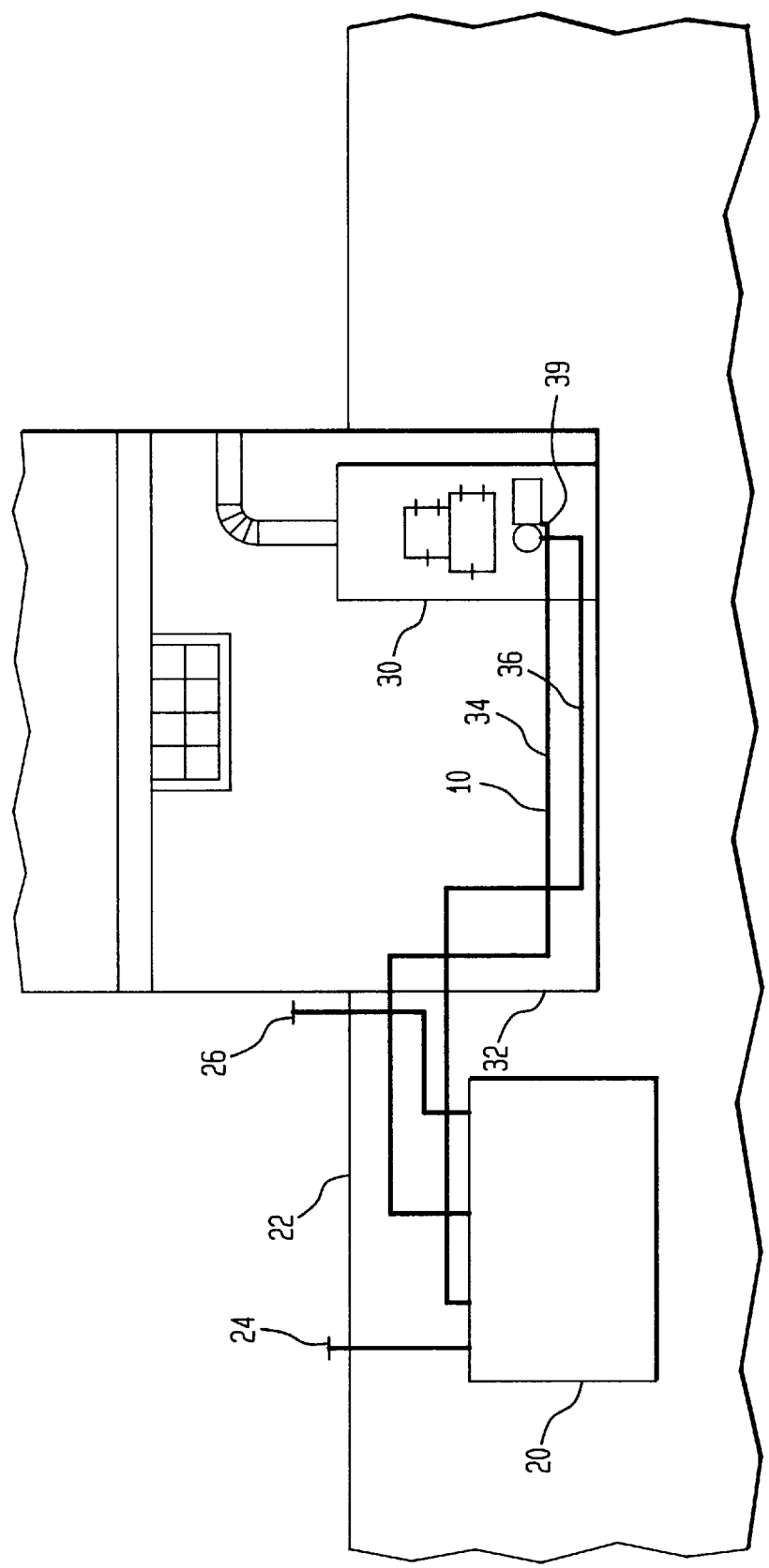
FIG. 3 is a schematic view of an embodiment of the invention disposed below ground for conveying heating oil from a subterranean tank to a furnace inlet of a home.

FIG. 3 illustrates a subterranean installation of the composite conduit in a residential heating oil system. It is preferred that the inner tube 12 has an outside diameter up to about four inches and that the extruded polyvinyl chloride with ultraviolet stabilizer layer 14 has a radial wall thickness ranging up to about two tenths of an inch. A typical residential installation, for example, uses a ⅜ inch O.D. copper tube having a polyvinyl chloride layer with a 0.032 inch wall thickness or a ½ inch O.D. copper tube with a 0.048 inch wall thickness polyvinyl chloride layer. A heating oil reservoir 20 is partly disposed below ground level 22. Sections of composite conduit 10 each form a fill pipe 24 and a vent pipe 26 of reservoir 20. The continuous piping system comprised of a plurality of joined sections of composite conduit 10 (shown as inlet tube 34 and return tube 36) is disposed substantially below ground level between reservoir 20 and residential oil burning furnace 30. Conduit 10 is also disposed partly embedded in the concrete foundation 32 of the building. Sections of conduit 10 are deformed as desired to facilitate installation. Sections of conduit 10 are connected to form continuous piping system 34 by being coupled, for example, to a reservoir outlet 36, being joined at joint 38 to other conduit sections, and being coupled to a furnace inlet 39.

In addition to its principal use in transporting or transferring heating oil, the composite conduit 10 can also be used, for example, on underground petroleum storage tanks to form fill pipes and vent pipes, which have commonly been made of coated fiberglass. A typical fill or vent pipe diameter is about 2 inches.

The composite conduit 10 can be used to form a piping system to transport water underground. A tube having a diameter between ¾ inch and 1 inch is common in a residential water supply system, while tubes larger than 2 inches are preferred for commercial uses and apartment buildings.

Further, the composite conduit 10 is suitable for applications such as refrigeration lines carrying chemicals such as Freon, or a replacement refrigerant, air conditioning lines, and cold and hot water lines. The outer polyvinyl chloride layer 14 contributes a thermal insulation property to composite conduit 10. Composite conduit 10 is therefore suitable where condensation may otherwise occur or where an unprotected tube carrying hot fluids may cause burning if touched.

Figure 4:
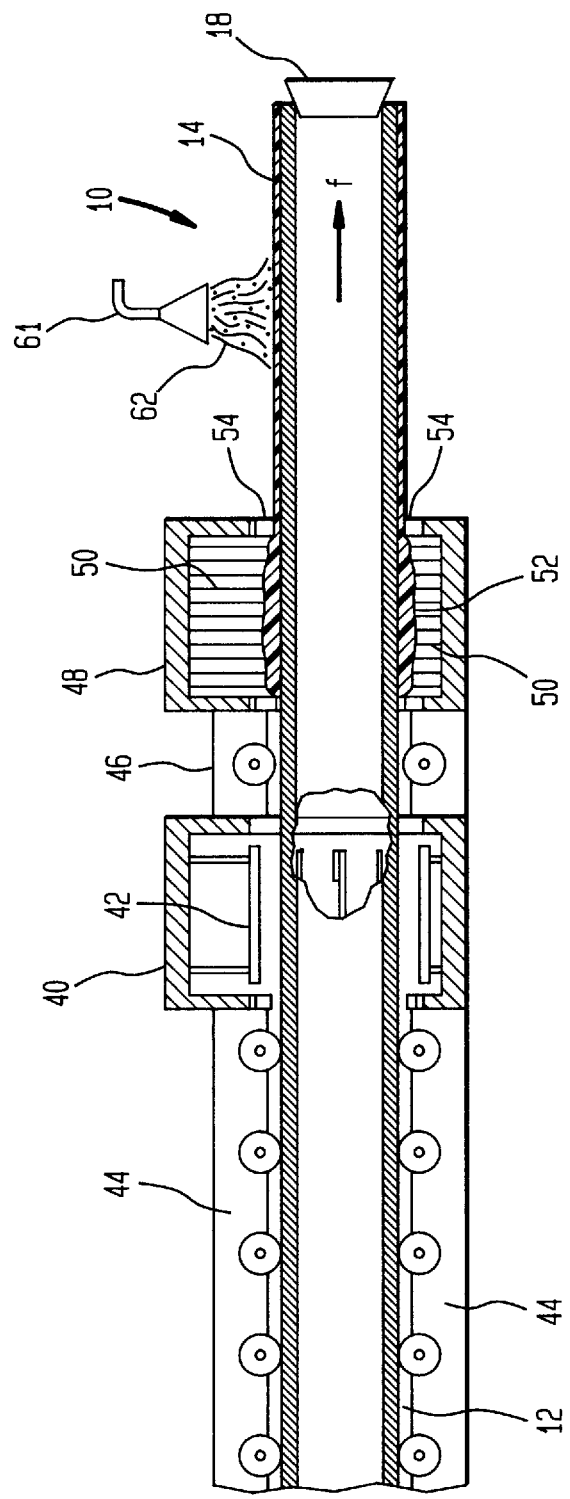
FIG. 4 is a side view, partially broken away, of an apparatus for practicing a method of producing the embodiment of FIG. 1.

The preferred method of making the composite conduit 10 can be understood with reference to FIG. 4. A length of elongate seamless copper tube 12, having a substantially uniform radial wall thickness around its circumference with a bore 16 therethrough, is plugged with plug 18 and is moved in a direction shown by arrow F through a heater 40 having heating elements 42 of suitable heat capacity to bring the tube to a desired temperature, between about 120° and 135° F. The tube 12, if irregular in shape, may be straightened before or after the heating step by means of a straightening device such as a device using oppositely apposed spaced-apart rollers 44. The tube 12, while still heated, is moved by idler rollers 46 through an extrusion device 48 wherein through nozzles 50 a heated layer 52 of melted thermoplastic polyvinyl chloride resin containing an ultraviolet stabilizer is extruded coextensively about tube 12. The outer polyvinyl chloride layer is extruded through sizing dies 54 in such a manner to provide an outer layer 14 having a desired annular wall thereon which is substantially uniform in radial thickness around its circumference. The composite conduit tube 10 thus formed is then sufficiently cooled by suitable means, such as a spray 62 from a water bath 61, so that the outer layer 14 hardens and becomes firmly coated around the copper tube 12.

Having described the present invention with particular reference to the disclosed preferred embodiments, it will be apparent to those skilled in this art that various changes and modifications may be made therein without departing from the scope and spirit of the invention which is disclosed and claimed herein.

I claim:

1. A composite conduit for underground conveyance of fuel oil, gasoline, or petrochemicals, the conduit consisting essentially of:

an inner substantially rigid yet deformable tube consisting essentially of copper or an alloy thereof having an outer diameter of ¹⁄₁₆ inch to 4 inches; and a single outer thermoplastic layer extruded around the inner substantially rigid tube, the outer layer of flame retardant flexible polyvinyl chloride having a thickness of up to about one-third inch and directly contacting the circumference of the inner substantially rigid tube for protecting the inner tube from corrosive effects of a subterranean environment, wherein the inner tube and the outer layer each have a substantially uniform radial wall thickness, and the outer layer is affixed to the tube without adhesives, and wherein the single outer layer is thin so that it can bend without cracking.

2. The composite conduit of claim 1 wherein the outer layer has a fungal inhibitor admixed with the flexible polyvinyl chloride.

3. The composite conduit of claim 1 wherein the outer layer has an ultraviolet stabilizer admixed with the flexible polyvinyl chloride.

4. The composite conduit of claim 1, wherein the inner tube has an outside diameter of up to about four inches, and the outer layer has a radial wall thickness ranging to about two tenths of an inch.

5. The composite conduit of claim 4, wherein the fluid is heating oil and the conduit is substantially buried below ground.

6. The composite conduit of claim 5, wherein the conduit is at least partially embedded in concrete.

7. The composite conduit of claim 5, wherein the conduit extends between a subterranean tank and a furnace inlet.

8. A corrosion resistant conduit for conveying liquid petroleum products, petrochemicals, and the like, the conduit being for subterranean use, and consisting essentially of:

an inner tube selected from the group consisting essentially of copper and alloys thereof and having an inside diameter sized to convey a viscous fluid and having an outer diameter of $\frac{1}{16}$ inch to 4 inches, and a single, thin outer layer extruded around and directly contacting said inner tube so as to adhere to the inner tube without the use of a bonding substance, the outer layer consisting essentially of flame retardant flexible polyvinyl chloride having a substantially uniform radial thickness of up to about two tenths inch for protecting the inner tube from corrosive effects of a subterranean environment, wherein the single outer layer can bend without cracking.

9. The elongate deformable conduit of claim 8, wherein the conduit is at least partially embedded in concrete.

10. The elongate deformable conduit of claim 8, wherein the inner tube has an outside diameter of about three-eighths inch, the outer layer has a thickness of about 0.10 inch and has admixed therewith an ultraviolet stabilizer.

11. A method of making a composite conduit for subterranean carriage of fuel oil, gasoline, or other petrochemical liquid, comprising providing an elongate copper or copper alloy tube having an inner diameter ranging up to about two inches, plugging a first end of the tube, and drawing said tube in a container of melted flame retardant flexible polyvinyl chloride, and through an extrusion die sized to remove sufficient flexible polyvinyl chloride to provide a single thin outer layer consisting essentially of a substantially uniform thickness of flexible polyvinyl chloride, said thickness ranging up to about two tenths of an inch, said melted flexible polyvinyl chloride adhering to the tube without use of a bonding substance, and said single outer layer being corrosion resistant and bendable without cracking, said composite conduit being able to convey fuel without leaking.

12. An elongate deformable conduit made in accordance with the method of claim 11.

13. A method of conveying fuel oil underground comprising:

providing a composite conduit in accordance with claim 11; and disposing the composite conduit substantially below ground.

14. A method in accordance with claim 13 wherein at least a portion of the composite conduit is embedded in concrete.

15. A method of conveying fuel oil, gasoline or liquid petrochemicals underground comprising the steps of:

forming an inner substantially rigid yet deformable tube having a substantially uniform radial wall thickness consisting essentially of copper and having an outer diameter of $\frac{1}{16}$ inch to 4 inches;

extruding, surrounding and bonding to the inner tube without the use of a bonding substance a single outer thermoplastic layer having a substantially uniform radial wall thickness and being thin so that the layer is bendable without cracking, the layer consisting essentially of flame retardant flexible polyvinyl chloride having a thickness of up to about one-third inch and surrounding and directly contacting the circumference of the inner tube for protecting the inner tube from corrosive effects of a subterranean environment; and disposing the inner tube bonded with the outer thermoplastic layer substantially below ground.

16. A method in accordance with claim 15 further comprising the step of admixing an ultraviolet stabilizer with the flexible polyvinyl chloride.

17. A method in accordance with claim 15 further comprising the step of embedding at least a portion of the inner tube bonded with the outer thermoplastic layer in concrete.

18. A method in accordance with claim 15 wherein the inner tube is formed with an outside diameter of up to about one-half inch and the outer thermoplastic layer has the radial wall thickness of about 0.10 inch.

* * * * *